United States Patent [19]

Gerace et al.

[11] Patent Number: 4,710,411
[45] Date of Patent: Dec. 1, 1987

[54] COMPATIBLE BEDDING COMPOUND FOR ORGANICALLY SEALED INSULATING GLASS

[75] Inventors: Michael J. Gerace, Kettering; Gary D. Krysiak, Englewood; Russell F. Schiappacasse, Dayton, all of Ohio

[73] Assignee: Protective Treatments, Inc., Dayton, Ohio

[21] Appl. No.: 930,680

[22] Filed: Nov. 14, 1986

Related U.S. Application Data

[62] Division of Ser. No. 741,522, Jun. 5, 1985.

[51] Int. Cl.$^4$ .............................................. E06B 3/24
[52] U.S. Cl. ...................................... 428/34; 52/172; 52/790; 156/109; 428/83; 428/441
[58] Field of Search ................. 428/34; 52/616; 156/109; 428/83, 441

[56] References Cited

U.S. PATENT DOCUMENTS

| | | | |
|---|---|---|---|
| 1,950,894 | 3/1934 | Koch | 524/502 |
| 2,514,194 | 5/1950 | Cline | 260/41.5 |
| 3,153,637 | 10/1964 | Schmidt et al. | 260/31.2 |
| 3,351,572 | 11/1967 | Jameson | 260/5 |
| 3,558,418 | 1/1971 | Porter, Jr. et al. | 161/162 |
| 3,998,680 | 12/1976 | Flint | 156/09 |
| 4,042,736 | 8/1977 | Flint | 428/34 |
| 4,110,148 | 8/1978 | Roscholl | 156/359 |
| 4,117,036 | 9/1978 | Honda et al. | 260/878 R |
| 4,132,044 | 1/1979 | Rollyson | 52/775 |
| 4,149,348 | 4/1979 | Pyzewski | 52/172 |
| 4,173,557 | 1/1979 | Strecker et al. | 525/194 |
| 4,194,995 | 3/1980 | Schermann et al. | 260/14 |
| 4,201,732 | 5/1980 | Wolinski et al. | 525/363 |
| 4,268,553 | 5/1981 | Marzouki et al. | 156/310 |
| 4,294,733 | 10/1981 | Marzouki et al. | 525/89 |
| 4,314,920 | 2/1982 | Millen | 525/189 |
| 4,348,435 | 9/1982 | Mistrick et al. | 428/34 |
| 4,368,341 | 1/1983 | Mathis et al. | 585/25 |
| 4,391,853 | 7/1983 | Pointon | 427/152 |
| 4,411,115 | 10/1983 | Marzouki et al. | 52/398 |
| 4,425,389 | 1/1984 | Scholhorn et al. | 428/34 |

FOREIGN PATENT DOCUMENTS

| | | |
|---|---|---|
| 2805986 | 8/1978 | Fed. Rep. of Germany . |
| 42-15471 | 8/1967 | Japan . |
| 6065047 | 4/1985 | Japan . |
| 60-181180 | 9/1985 | Japan . |
| 953989 | 4/1964 | United Kingdom . |

OTHER PUBLICATIONS

Box, James A., "The Glazing Compatibility Problem", Glass Digest, Dec. 15, 1981, pp. 58, 59.
Damusis, Adolfas, Sealants (1968), pp. 8-9 and 180-181.

Primary Examiner—Joseph L. Schofer
Assistant Examiner—N. Sarofim
Attorney, Agent, or Firm—Killworth, Gottman, Hagan & Schaeff

[57] ABSTRACT

An improved bedding composition for use in sealing insulating glass units to frames, mullions, or the like is provided. The bedding composition includes a polar solvent, a plasticizer, and an elastomer and is compatible with available insulating glass sealant compositions including hot melt adhesives.

6 Claims, 3 Drawing Figures

COMPATIBLE BEDDING COMPOUND FOR ORGANICALLY SEALED INSULATING GLASS

This is a division of application Ser. No. 741,522 filed June 5, 1985.

BACKGROUND OF THE INVENTION

This invention relates to sealant compositions and more particularly to bedding compositions for use in sealing insulated glass units to a frame or the like.

During the last several years, the use of insulating glass to improve the thermal efficiency of various building structures has become commonplace. Insulated glass units have been developed which have permitted such systems to be mass produced commercially and installed in building structures of all types.

These insulating glass units are essentially two panes of glass which have been sealed along their outer periphery with an organic sealant composition. The two panes of glass are separated along their outer perimeter by a continous, generally rectangular-shaped metal spacer tube. This metal spacer tube is usually perforated and filled with an inorganic desiccant. The perforated side of the spacer is positioned so that it is in communication with the inside of the insulating glass unit so that moisture from the inside of the unit may be absorbed by the desiccant. An organic sealant is used to bond the panes of glass to the spacer along the outer perimeter of the unit.

The insulating glass unit thus is sealed by the organic sealant from any further atmospheric moisture infiltration while the desiccant in the tubed metal spacer absorbs moisture from the interior of the unit. This design of the insulating glass unit prevents frosting and moisture condensation from occurring inside the unit during exposure to low temperatures.

During the installation of the insulating glass unit, the unit is placed into a metal or wooden frame or positioned against a mullion or the like. Prior to positioning the insulating glass unit in the frame or against a mullion, a glazing or bedding compound is applied to the frame or mullion to provide a seal between the insulating glass unit and the frame or mullion. This seal prevents air or moisture penetration through the frame or mullion and insulating glass unit interface.

There are a variety of sealants which are used in insulating glass units. At present, the most widely used insulating glass sealant is a polysulfide based polymer. These sealants are essentially formed-in-place gaskets which are produced by chemical curing via a cross-linking reaction of a liquid polysulfide base and a metallic oxide curing agent. The cross-linked nature of the sealant provides a reasonable degree of chemical resistance. Other insulating glass sealants are silicone based polymers and polyurethanes. These sealants are also chemically cross-linked, and likewise, typically have reasonable chemical resistance to a wide variety of commercially available solvent-based bedding compounds.

However, another class of insulating glass sealants are hot melt sealants such as hot melt butyl rubber sealants. Such hot melt sealants are increasing in popularity because of their high adhesion properties, low water vapor transmission, and ease of application. Unlike the above-described chemically cured insulating glass sealants that are flowed into place and solidified by a chemical cross-linking mechanism, these hot melt sealants are melted, flowed into place while hot, and form solid seals upon cooling. Such hot melt systems generally do not possess a high degree of cross-linking (if they did they would not be flowable when heated) and have limited chemical resistance. Consequently, during the glazing operation, if such hot melt systems come into contact with typical commercially available solvent-based bedding compounds, they have a tendency to soften permanently and/or lose adhesion to the insulating glass panes or the metal spacer. This results in failure of the insulating glass unit.

This incompatibility between hot melt sealants and typical solvent based bedding compounds is to be distinguished from a different compatibility problem also faced in this art, namely, initial adhesion compatibility between insulating glass sealants and bedding compounds. This latter problem has been addressed by Mistrick et al, U.S. Pat. No. 4,348,435, which teaches the application of an acrylic emulsion primer to a hot-melt butyl insulating glass sealant to promote adhesion to a silicone-based glazing compound. However, Mistrick does not address or solve the problem of long term permanent softening or loss of adhesion between hot melt sealants and bedding compounds. Moreover, the primer of Mistrick is designed only for the class of silicone-based glazing compounds and adds a further manufacturing step to the production of sealant insulating glass units.

As hot melt sealants have become increasingly more widespread in usage, there is a need in this art to provide a solvent-based bedding compound that is not only compatible with chemically cured insulating glass sealant compounds but is also compatible with hot melt systems. That is, there is a need for a bedding compound which, when in contact with an insulating glass sealant, will not unduly soften it or cause it to lose adhesion to the glass or metal spacer of the insulating glass unit.

SUMMARY OF THE INVENTION

The present invention meets that need by providing a solvent-based bedding composition which is not only compatible with chemically cured insulating glass sealants but also compatible with hot melt insulating glass sealants. According to one aspect of the present invention, a bedding composition for use in sealing insulated glass units to a frame, mullion or the like is provided which includes a polar solvent or mixture of polar solvents which are substantially insoluble with non-polar hydrocarbon compounds; a plasticizer selected from the group consisting of a polar plasticizer containing at least one noncarbon/hydrogen functional group, a polymeric plasticizer, and mixtures thereof; and an elastomer compatible with the polar solvent and plasticizer. The present invention also provides a method for sealing an insulated glass unit to a frame, mullion or the like which includes the steps of applying the bedding compound to the frame and sealing the insulated glass unit against the bedding compound in the frame. Finally, the present invention provides a sealed and glazed window unit which includes an insulated glass unit sealed to a frame utilizing the compatible bedding composition of the present invention.

Accordingly, it is an object of the present invention to provide a bedding composition for use in sealing insulated glass units to a frame which is compatible with all commercially available types of insulating glass sealants such that upon application, the bedding composition will not unduly soften or cause the insulating glass sealant to lose adhesion to the glass or metal components of an insulating glass unit. This and other objects and advantages of the invention will become apparent from the following detailed description, the accompanying drawings, and appended claims.

DETAILED DESCRIPTION OF THE PREFERRED EMBODIMENTS

Figure 1:
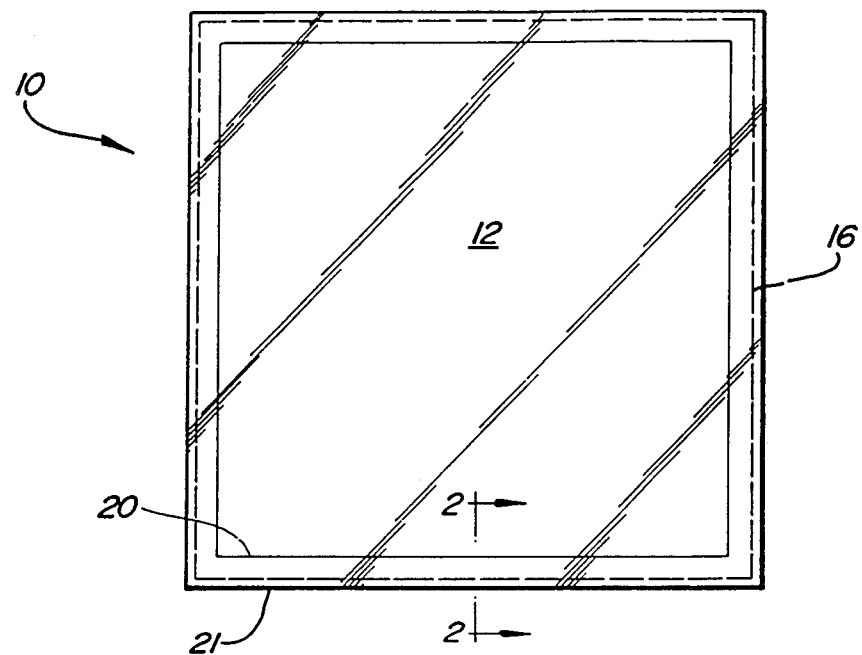
FIG. 1 is a front elevational view of a typical insulated glass unit.

With respect to commercially available solvent-based bedding compositions, we have determined that such bedding compositions are incompatible with some insulating glass sealants, and in particular, the class of hot melt sealants. This is because of interaction of certain components of the bedding compositions with the insulating glass sealant. Both the insulating glass sealant and the bedding compositions contain ingredients which exchange by diffusion or migration at the interface between the two compositions. This mixing or chemical intermingling of the components of the two different sealing compositions can and does alter the physical characteristics of the insulating glass sealant, ultimately causing insulating glass unit failures.

We have determined that this incompatibility which causes insulating glass sealants to soften and/or lose adhesion is caused both by interaction of the insulating glass sealant with typical solvents used in these bedding compositions and by the migration of oils and/or plasticizers from the bedding compound into the insulating glass sealant. We have further determined that in many instances a particular individual solvent or plasticizer which is present in a bedding compositions by itself does not cause insulating glass sealant failure. However, when solvents and plasticizers are found together in the same bedding compound, insulating glass sealant failure occurs, apparently because of the synergistic negative effects of solvent and plasticizer migration into the insulating glass sealant.

The bedding composition of the present invention avoids these problems and is compatible with all classes of commercially available insulating glass sealants, and in particular, the class of hot melt sealant insulating glass sealants. The bedding composition of the present invention not only is compatible with insulating glass sealants, but also has all of the necessary functional properties of a good bedding composition including adequate adhesion, strength, hardness, flow and slump properties, as well as low temperature flexibility and satisfactory handling properties.

The bedding composition of the present invention has three primary components including a polar solvent, a plasticizer, and an elastomer. Optionally, the bedding composition of the present invention may also include one or more fillers or pigments, tackifiers, and stabilizing compounds.

The polar solvents which are utilized as a component of the bedding composition of the present invention are substantially insoluble with the nonpolar hydrocarbons found in insulating glass sealant compositions. The polar solvents of the present invention contain elements or functional groups other than carbon and hydrogen.

Classes of solvents useful in the practice of the present invention include ketones, esters, alcohols, and other compositions which contain at least one hetero atom. Examples of specific solvents useful in the practice of the present invention include: acetone, ethyl acetate, methyl ethyl ketone, propyl acetate, methyl propyl ketone, butyl acetate, methyl isobutyl ketone, amyl acetate, methyl amyl ketone, isobutyl isobutyrate, cyclohexanone, diacetone, 1,4 dioxane, di-isobutyl ketone, tetrahydrofuran, isophorone, dimethyl formamide, nitromethane, Nipar S-20, Nipar S-30, nitroethane, methylene chloride, ethylene dichloride, monochlorobenzene, dichlorobenzene, trichloroethylene, perchloroethylene, propylene dichloride, trichlorobenzene, methanol, ethanol, isopropanol, and mixtures or blends of these solvents.

Plasticizers useful in the practice of the present invention may be selected from those polar plasticizers which contain noncarbon/hydrogen functionality as well as polymeric plasticizers which have low diffusion rates because of their higher molecular weight. Examples of monomeric polar plasticizers containing at least one hetero atom include: dibutyl succinate, dibutyl sebacate, N,N,-dimethyl caprylamide capramide, N,N,-dimethyl oleoamide, dibutoxyethyl adipate, dibutoxyethyl glutarate, dibutoxyethyl sebacate, dibutoxyethyl azelate, dibenzyl sebacate, dibenzyl azelate, didecyl glutarate, diisobutyl adipate, diisodecyl adipate, diisodecyl glutarate, diisooctyl adipate, diisooctyl dodecanedioate, dioctyl adipate, octyl decyl adipate, octyl pthalate, isooctyl phthalate, butoxyethyl laurate, butoxyethyl oleate, dioctyl azelate, butyl oleate, triethylene glycol capratecaprylate, dioctyl azelate, triethylene glycol di-2-ethylhexanoate, triethylene glycol dipelargonate, triethylene glycol dibenzoate, dibutyl phthalate, tetraethylene glycol di-2-ethylhexanoate, diisodecyl phthalate, dioctyl phthalate, diisoctyl phthalate, ditridecyl phthalate, diallyl phthalate, octyldecyl phthalate, diisononyl phthalate, epoxidized soybean oil, trioctyl trimellitate, tributoxyethyl phosphate, triaryl phosphate, tributyl phosphate, tricresyl phosphate, trictyl phosphate, trixylenyl phosphate, propylene glycol dibenzoate, dipropylene glycol dibenzoate, triethylene glycol dibenzoate, butyl stearate, dibutoxyethyoxyethylformal, dimethyl sebacate, polyethylene glycol dibenzoate, butyl benzyl phthalate, butyl octyl phthalate, dihexyl phthalate, methyl oleate, trimethylpentanediol diester, diethylene glycol mono-laurate, oleyl nitrile, tris-$\beta$ chloroethyl phosphate, tris-$\beta$ chloropropyl, N-ethyl toluenesulfonamide, phosphate, and blends or mixtures of the above.

The polymeric plasticizers may be reaction products of any combination of polyfunctional alcohols and acids. Examples of individual alcohol and acid moieties which can be reacted to produce polymeric plasticizers for the present invention may be hydrolysis products of monomeric esters of the plasticizers described above.

With respect to elastomers which are useful in the practice of the present invention, such elastomers, or blends thereof, should be compatible with the solvents and plasticizers described above. Examples of suitable elastomers include polychloroprene, nitrile rubber, acrylic rubber, epichlorohydrin, ethylene acrylic rubber, and chlorosulfonated polyethylene.

For example, the nitrile rubber used as a component of the bedding composition of the present invention may be an acrylonitrile-butadiene polymer containing from 20–50% of acrylonitrile and have a molecular weight of between 10,000 and 5,000,000. An example of such a nitrile rubber is Hycar 1022 (trademark) having a molecular weight of approximately 750,000 available from Goodrich Chemical Company. Polychloroprene rubbers are available as copolymers of chloroprene and 2,3 dichloro-1,3-butadiene having a molecular weight of between 10,000 and 1,250,000. An example of such a Polychloroprene rubber is Neoprene WM-1 (trademark), having a molecular weight of approximately 200,000 available from E. I. duPont de Nemours Company.

It is preferred that the bedding composition contain from about 10–50% of the polar solvent, from 5–25% by weight of the plasticizer, and from 1–30% by weight of the elastomer component. Additionally, the composition may contain other optional ingredients such as fillers and/or pigments, tackifiers, and stabilizers.

Examples of suitable fillers and/or pigments include talc and ground limestone. Platy talc, having a particle size of approximately 6.5 millimeters, is an example of a suitable talc. Such talc is available under the designation NP-45-26 from Pfizer Inc. Ground limestone having an average particle size of approximately 7.0 millimeters is also suitable and is available from Armco Carbonate Fillers.

Tackifiers may also be added to the composition to increase its adhesive properties. An example of a suitable tackifier is a mixture of coumarone-indene resin, phenolic resin, and liquid nitrile rubber. Finally, one or more stabilizers may be added to the composition. An example of a suitable stabilizing compound is a polymerized hydroquinone available from R. T. Vanderbilt Company under the designation Agerite resin MA (trademark).

In order that the invention may be more completely understood, reference is made to the following nonlimiting example.

EXAMPLE

A bedding composition in accordance with the present invention was prepared as follows. All percentages are by weight unless otherwise indicated.

A jacketed double mixer of the type sold by Charles Ross & Sons Company, Hauppauge, N.Y. or J. H. Day Mixing Company, Cincinnati, Ohio, having a working capacity of approximately 300 gallons is used to prepare and mix the bedding composition. The heating/cooling jacket is left at ambient temperature. The mixer is charged with 317 pounds Hycar 1022 TM nitrile rubber, 62 pounds Neoprene WM-1 TM polychloroprene rubber, 450 pounds of tackifiers and adhesion promoters, 250 pounds of talc, 500 pounds of ground limestone and approximately 150 pounds of other pigments and additives and allowed to mix for 60 minutes. Over this length of time, in the absence of any exterior sources of heating or cooling, the mixture will reach a temperature of approximately 250° F.

Cooling water is then applied to the jacket of the mixer and 500 pounds of a benzoate ester plasticizer is added 50 pounds at a time. Three to five minutes mix time is allowed between charges to maintain a solid mass in the mixer as opposed to lumps of rubber rolling around in the plasticizer oil. Approximately 45 pounds of stabilizers and additives are charged to the mixer and mixed 5 minutes. Approximately 680 pounds of methyl ethyl ketone is then charged to the mixer no more than 50 pounds at a time while keeping a solid mass in the mixer, similar to the plasticizer addition procedure. The bedding composition continues to be mixed for 15 minutes after the last solvent addition before the process is complete.

The bedding composition prepared above has the following final composition:

| Ingredient | Wt. % |
| --- | --- |
| Nitrile Rubber | 11 |
| Polychloroprene Rubber | 2 |
| Benzoate Ester Plasticizer | 17 |
| Methyl Ethyl Ketone | 24 |
| Talc | 10 |
| Ground Limestone | 18 |
| Tackifiers | 16 |
| Stabilizers | 2 |

Figure 2:
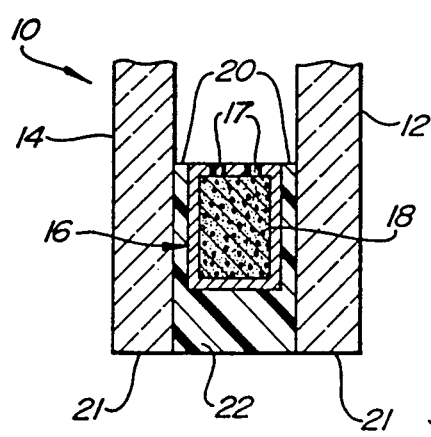
FIG. 2 is a sectional view taken along line 2—2 in FIG. 1.

FIGS. 1 and 2 illustrate a typical insulating glass unit structure. Insulating glass unit 10 includes a pair of glass sheets or panes 12 and 14. Glass sheets 12 and 14 are separated by a hollow, galvanized steel spacer 16 having holes or perforations 17 positioned so that they face the interior of unit 10. A dessicant 18 is contained in spacer 16. The dessicant serves to absorb moisture from the inside of the unit to prevent moisture condensation on the glass sheets 12 and 14.

The spacer 16 is secured to adjacent marginal edge portions of sheets 12 and 14 by a layer of insulating glass sealant 20. As shown, spacer 16 is recessed from the adjacent peripheral edge portions 21 of glass sheets 12 and 14 to provide a peripheral channel 22 which is also filled with insulating glass sealant.

Figure 3:
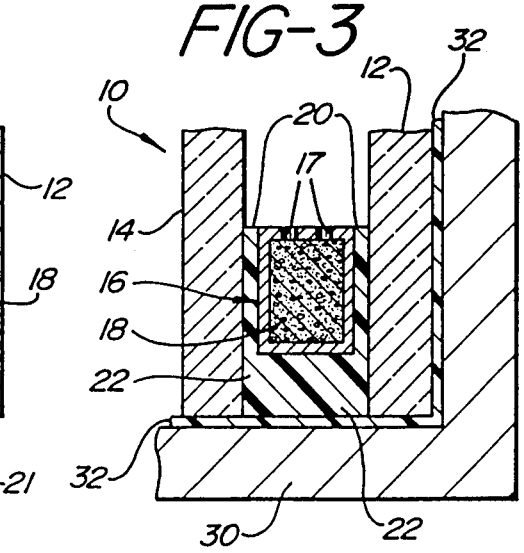
FIG. 3 is a sectional view of a portion of the insulated glass unit of FIG. 1 sealed in a frame utilizing the bedding composition of the present invention.

As can be seen from FIG. 3, the insulating glass unit 10 is seated in frame 30 to provide a sealed and glazed window unit. Bedding composition 32 is applied to frame 30 prior to the insertion of unit 10, and after curing, forms a gas and moisture tight seal between frame 30 and unit 10.

As illustrated, bedding composition 32 is in contact with insulating glass sealant 20 along peripheral channel 22. Previously, this line of contact resulted in premature failure of the insulating glass sealant 20, particularly if it was hot melt adhesive sealant, due to migration into and interaction with one or more components of the bedding compound. However, use of the bedding composition of the present invention avoids these problems and provides compatability between the sealants and bedding composition so that no softening or loss of adhesive properties in the sealant occurs.

While the compositions, structures, and methods described herein constitute preferred embodiments of the invention, it will be appreciated that the invention is not limited to these precise embodiments, and that changes may be made in either without departing from the scope of the invention, which is defined in the appended claims.

What is claimed is:

1. A method of sealing an insulated glass unit to a frame comprising the steps of applying a bedding composition to said frame; said bedding composition being compatible with the sealant used to form said insulated glass unit and comprising a polar solvent or mixture of polar solvents which are substantially insoluble with nonpolar hydrocarbons, a plasticizer selected from the group consisting of a polar plasticizer containing at least one noncarbon/hydrogen functional group, a polymeric plasticizer, and mixtures thereof, and an elastomer compatible with said polar solvent and said plasticizer; and sealing said insulated glass unit against said bedding compound and said frame.

2. The method of claim 1 in which said bedding composition contains from 10–50% by weight of said polar solvent, from 5–25% by weight of said plasticizer, and from 1–30% by weight of said elastomer.

3. The method of claim 2 in which said bedding composition further includes 1–50% by weight of a filler or pigment, 5–25% by weight of a tackifier, and 1–5% by weight of a stabilizer.

4. A sealed, glazed window unit comprising an insulated glass unit sealed to a frame utilizing a bedding composition extending about the periphery of said frame and in contact with said insulated glass unit, said bedding composition comprising a polar solvent or mixture of polar solvents which are substantially insoluble with nonpolar hydrocarbons, a plasticizer selected from the group consisting of a polar plasticizer containing at least one noncarbon/hydrogen functional group, a polymeric plasticizer, and mixtures thereof, and an elastomer compatible with said polar solvent and said plasticizer.

5. The window unit of claim 4 in which said bedding composition contains from 10–50% by weight of said polar solvent, from 5–25% by weight of said plasticizer, and from 1–30% by weight of said elastomer.

6. The window unit of claim 4 in which said insulated glass unit is sealed with a hot-melt sealant.

* * * * *